(12) United States Patent
Toothman, III et al.

(10) Patent No.: US 7,395,960 B1
(45) Date of Patent: Jul. 8, 2008

(54) SYSTEM AND METHOD FOR DELIVERING INFORMATION AT REMOTE LOCATIONS

(75) Inventors: Glenn R. Toothman, III, Waynesburg, PA (US); Ravinder P. Chandhok, Waynesburg, PA (US); Kimberly H. Chandhok, Waynesburg, PA (US)

(73) Assignee: Memory Medallion, Inc., Waynesburg, PA (US)

( * ) Notice: Subject to any disclaimer, the term of this patent is extended or adjusted under 35 U.S.C. 154(b) by 0 days.

(21) Appl. No.: 09/481,577

(22) Filed: Jan. 12, 2000

(51) Int. Cl.
*G06K 5/00* (2006.01)
(52) U.S. Cl. ...................... 235/382; 235/376
(58) Field of Classification Search ............... 235/382, 235/385, 376, 492, 472.01, 472.02; 711/100, 711/102, 103, 111; 340/10.1, 10.51
See application file for complete search history.

(56) References Cited

U.S. PATENT DOCUMENTS

| | | | | |
|---|---|---|---|---|
| 4,656,463 A | * | 4/1987 | Anders et al. | 340/573.4 |
| 4,689,757 A | * | 8/1987 | Downing et al. | 341/101 |
| 4,778,391 A | * | 10/1988 | Weiner | 434/317 |
| 4,814,595 A | * | 3/1989 | Gilboa | 235/492 |
| 4,837,568 A | | 6/1989 | Snaper | 340/825.54 |
| 4,887,165 A | * | 12/1989 | Sato et al. | 358/474 |
| 5,335,276 A | * | 8/1994 | Thompson et al. | 380/266 |
| 5,640,164 A | | 6/1997 | Gunnarsson | |
| 5,696,488 A | * | 12/1997 | Assisi | 235/375 |
| 5,848,373 A | | 12/1998 | DeLorme et al. | 701/200 |
| 5,940,447 A | * | 8/1999 | Connell et al. | 235/380 |
| 5,948,040 A | | 9/1999 | DeLorme et al. | 701/201 |
| 5,992,752 A | | 11/1999 | Wilz, Sr. et al. | 235/472.01 |
| 6,008,727 A | * | 12/1999 | Want et al. | 340/572.1 |
| 6,028,601 A | * | 2/2000 | Machiraju et al. | 345/336 |
| 6,078,928 A | * | 6/2000 | Schnase et al. | 707/104 |

(Continued)

FOREIGN PATENT DOCUMENTS

DE 3533705 A1 * 8/1986

(Continued)

OTHER PUBLICATIONS iButton Manual dated Aug. 12, 1997.

*Primary Examiner*—Lisa M Caputo
(74) *Attorney, Agent, or Firm*—Gibbons P.C.

(57) ABSTRACT

Systems and methods of using the systems for delivering information related to a remote location to individuals at the remote location are disclosed. The system comprises a memory device affixed to a physical object at the remote location, the information related to the remote location residing on the memory device, and a portable memory reading device, separate from the memory device, that retrieves the information from the memory device when positioned at the remote location and communicates the information to a party located at the remote location. The system may further comprise a database wherein the information residing on the memory device is replicated and the database can be accessed by a user of the system via a suitable communications medium or combination of mediums. The system may also comprise a portable memory reading device having a GPS receiver positioned at a remote location and a database, such that the GPS coordinates of the remote location are determined by the portable memory reading device and communicated to the database over a communications link, and the database communicates the information related to the remote location back to the portable memory reading device over the communications link.

20 Claims, 3 Drawing Sheets

U.S. PATENT DOCUMENTS 6,089,458 A * 7/2000 Lake .......................... 235/488

FOREIGN PATENT DOCUMENTS

| | | | |
|---|---|---|---|
| DE | 3922677 A1 * | 1/1991 |
| EP | 380727 A1 * | 8/1990 |
| JP | 09-062651 A * | 3/1997 |
| JP | 9-154709 A | 6/1997 |
| JP | 11-353307 A | 12/1999 |

* cited by examiner

SYSTEM AND METHOD FOR DELIVERING INFORMATION AT REMOTE LOCATIONS

BACKGROUND

I. Field of the Invention

The present invention relates generally to the delivery of information, and more particularly to a system and method for delivering information related to a remote location to individuals at the remote location.

II. Description

In common occurrence, many notable locations are physically removed from easily accessible sources of power and communication such as electrical outlets and wireline telephone jacks. This is particularly true in the case of cemeteries and historically significant locations. Consequently, it is difficult to both place information about the notable locations in close proximity thereto and to revise that information once so placed.

In the case of cemeteries, friends and loved ones typically place memorial and/or genealogical information such as name, date born, date passed, notable accomplishments, parents, siblings, children, etc., about the deceased party directly on the tombstone or other graveyard marker. Friends and loved ones also sometimes place photographs of the deceased and/or the family of the deceased on or nearby the tombstone or other graveyard marker that may or may not have been weatherized in some form or another. In the case of historically notable locations, interested parties typically place signs, placards, photographs, artist's renderings, etc., about the historically notable location that may or may not have been weatherized in close proximity to the notable location. Occasionally, interactive tape recordings and/or videos are placed in close proximity to the notable location.

In any event, whether the remote location is a cemetery location, historically notable location, or some other notable but remote location, the need for the information and any equipment necessary for accessing that information to both withstand the weather conditions likely encountered at the location and any attempts to remove them from the location without authorization severely limits both the amount and types of information that may be placed at the remote location with current systems. Accordingly, there is a need for a system and method of placing and communicating large quantities and varied types of information at remote locations that can withstand the weather conditions and attempts to remove that information likely to be encountered at the remote location.

SUMMARY OF THE INVENTION

The present invention is directed to a system and method for delivering information related to a remote location at the remote location. In one embodiment, the invention comprises a system for providing information related to a remote location comprising a memory device affixed to a physical object at the remote location, the information residing on the memory device; and a portable memory reading device, separate from the memory device, that retrieves the information from the memory device when positioned at the remote location and communicates the information to a party located at the remote location. In another embodiment, the invention comprises a system for providing information related to a remote location comprising a memory device affixed to a physical object at the remote location, the information residing on the memory device; a portable memory reading device, separate from the memory device, that retrieves the information from the memory device when positioned at the remote location and communicates the information to a party located at the remote location; and a database wherein the information residing on the memory device is replicated; and wherein the memory device is uniquely associated with an identifying code. In yet another embodiment, the invention comprises a system for providing historical information about a historically notable location comprising a memory device affixed to a physical object positioned at the historically notable location, the historical information residing on the memory device; and a portable memory reading device, separate from the memory device, that retrieves the historical information from the memory device when positioned at the historically notable location and communicates the historical information to a party located at the historically notable location. In a still further embodiment, the invention comprises a system for providing memorial information about a deceased party interred at a cemetery location comprising a memory device affixed to a physical object positioned at the cemetery location, the memorial information residing on the memory device; and a portable memory reading device, separate from the memory device, that retrieves the memorial information from the memory device when positioned at the cemetery location and communicates the memorial information to a party located at the cemetery location. In yet another embodiment of the invention, the invention comprises a method for providing information related to a remote location, comprising the steps of storing the information on a memory device, the information being stored in a format that can be retrieved from the memory device and displayed to a party with a portable memory reading device, separate from the memory device, when the portable memory reading device is in close proximity to the memory device; and affixing the memory device to a physical object positioned at the remote location. Additional steps in the method may include replicating the information stored on the memory device in a database; revising the replicated information at the database, and communicating the revised replicated information to the memory device over a communicable connection between the database and the memory device; and/or providing the replicated information over a communications medium upon receipt by the database of an identifying code, the identifying code being uniquely associated with the memory device having the information stored thereon.

BRIEF DESCRIPTION OF THE DRAWINGS

The features, objects and advantages of the present invention will become more apparent from the detailed description set forth below when taken in conjunction with the drawings, in which like reference characters identify corresponding elements throughout, and wherein.

DETAILED DESCRIPTION OF THE PREFERRED EMBODIMENTS

Figure 1:
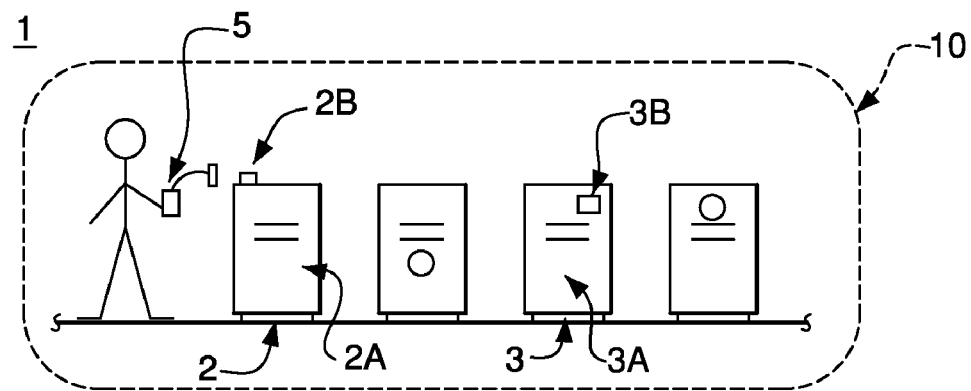
FIG. 1 is a block diagram of a system for providing information related to a remote location in accordance with a first preferred embodiment of the invention.

Referring to FIG. 1, there is shown a block diagram of a system 1 for providing information related to remote locations in accordance with preferred embodiments of the invention. A number of locations 2-3 in a cemetery 10 have memory devices 2B-3B permanently affixed to tombstones 2A-3A at locations 2-3 respectively. Cemetery 10 may comprise a catacomb, cinerarium, crypt, mausoleum, ossuary, sepulcher, tomb, vault, or any other location where a deceased party may be laid to rest either temporarily or permanently. A deceased party may comprise any living organism that has passed, including but not limited to human beings that have passed. Tombstones 2A-3A may comprise any type of physical object used to mark the locations 2-3 of deceased parties within cemetery 10. Memory devices 2B-3B have memorial and/or genealogical information about the deceased party interred at locations 2-3 stored therein or thereon. This information may comprise any information related to the deceased party that a friend or loved one may find interesting including, but not limited to the name, date born, date passed, notable accomplishments, parents, siblings, children, etc., of the deceased party as well as photographic and artistic images of or relating to the deceased party.

In preferred embodiments of the invention, memory devices 2B-3B comprise contact memory devices, and each memory device may be may be uniquely associated with an identifying code. Contact memories generically comprise physical devices that attach directly to an object and can be read through active or passive contact with a reading device. Typically contact memories are approximately the size of a clothing button, and comprise a stainless steel container housing a small memory chip inside. Information can usually be written to the contact memory through temporary active or passive contact with the contact memory as well. In preferred embodiments of the invention, memory devices 2B-3B comprise a commercially available iButton® contact memory device, the mechanical and technical standards for which are incorporated hereby by reference. Memory devices 2B-3B may also comprise, in addition to contact memories, read only memory (ROM) devices, electronically erasable programmable read only memory (EEPROM) devices, electronically programmable read only memory (EPROM) devices, random access memory (RAM) devices, static random access memory (SRAM) devices, static bar codes, or any other device that is small in size, can be easily and permanently attached to a physical object, can store large quantities and varied types of information, and can withstand extreme weather conditions without losing or damaging the information stored therein and/or thereon. The information is stored in and/or on the memory device in a format suitable for the type of memory device used, extensible markup language or hypertext markup language comprising the preferred format.

Referring still to FIG. 1, system 1 further comprises a portable memory reading device 5. Portable memory reading device 5 may comprise a special purpose computer, a portable general purpose computer such as a laptop computer, or any other type of portable computerized device, including a hand-held portable computer, a wireless communications device, and/or a smart wireless communications device, that has the ability to read, receive, and/or display all or a portion of the information stored on memory devices 2B-3B when placed at locations 2-3 or in close proximity to memory devices 2B-3B. Typically, portable memory reading device 5 will have an integrated means of reading, receiving, and/or writing information from or to memory devices 2B-3B. In other cases, portable memory reading device 5 may have a hand-held probe attached thereto through some type of serial and/or parallel electrical connection for reading, receiving, and/or writing information from and/or to memory devices 2B-3B. The precise means of reading, receiving, and/or writing of the information employed is a matter of design choice and will necessarily depend on the type of memory device 2B-3B employed. Where the memory devices 2B-3B employed are contact memories, a preferred means of reading and/or writing comprises a single signal plus ground probe, whether integrated or hand-held, configured to an input/output line of a microcomputer.

Figure 2:
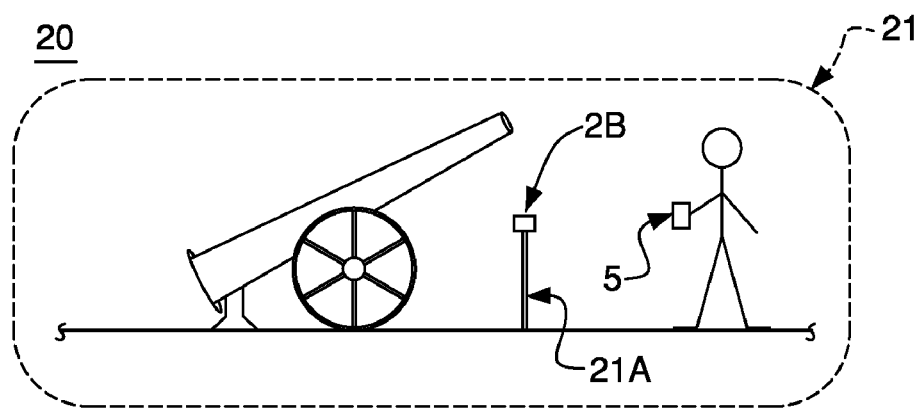
FIG. 2 is a block diagram of a system for providing information related to a remote location in accordance with a second preferred embodiment of the invention.

Referring now to FIG. 2, there is shown a block diagram of a system 20 for providing information related to a remote location 21 in accordance with a second preferred embodiment of the invention. System 20 comprises a memory device 2B permanently affixed to post 21A located at historically notable location 21, and portable memory reading device 5. Memory device 2B and portable memory device 5 comprise the same elements as in system 1 described above, except that the information stored in and/or on memory device 2B comprises historical information about historically notable location 21. Post 21A comprises a stake anchored to the ground at historically notable location 21, but may also comprise a sign, lamppost, doorframe, fencepost, cannon, or any other physical object, whether stationary or movable and whether permanent or temporary, located at or near historically notable location 21. Historically notable location 21 comprises any location physically removed from convenient access to electrical and/or wireline telephone service that a person may find historically interesting because of events that have occurred, are occurring, or may be occurring in the future, and historically notable information comprises any information about the events that have occurred, are occurring, or may be occurring at remote location 21 in the future.

Figure 3:
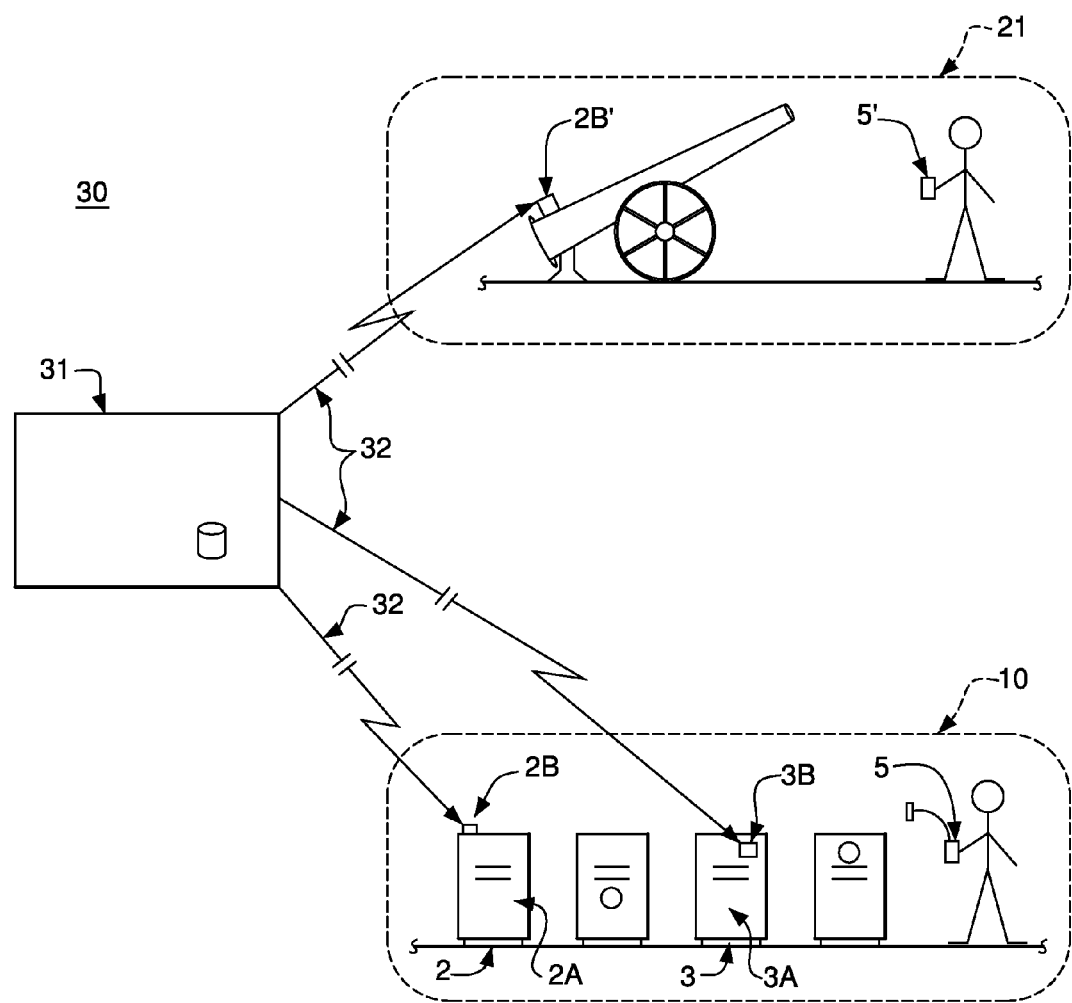
FIG. 3 is a block diagram of a system for providing information related to a remote location in accordance with a third preferred embodiment of the invention.

Referring now to FIG. 3, there is shown a block diagram of a system 30 for providing information related to a remote location 21 in accordance with a third preferred embodiment of the invention. System 30 comprises memory device 2B, 3B, and 2B' permanently affixed to tombstones 2A and 3B and post 21A respectively, tombstones 2A-3A located in cemetery 10 and post 21A located at historically notable location 21, portable memory reading devices 5 and 5', and database 31 communicably connected 32 to memory devices 2B, 3B, and 2B'. Memory devices 2B, 3B, and 2B', tombstones 2A-3A, post 21A, historically notable location 21, and portable memory reading devices 5 and 5' comprise the same elements as in systems 1 and/or 20 described above. Database 31 comprises a single or central database wherein the information stored in and/or on memory devices 2B, 3B, and/or 2B' is replicated in whole or in part, or a plurality of distributed databases wherein the information stored in and/or on memory devices 2B, 3B, and/or 2B' is replicated in whole or in part.

In the case where database 31 comprises a plurality of distributed databases, the plurality of databases may be connected to one another via an internet connection, limited or wide area network connection, or some other type of suitable communicable connection or combination of connections as would be known in the art, and the information stored in and/or on memory devices 2B, 3B, and/or 2B' may be replicated on each or some lesser number of the databases in the plurality. The communicable connection 32 to memory devices 2B, 3B, and/or 2B' may comprise an internet connection, a limited and/or wide area network connection, a wireless communications connection, a wireline telephone connection, or some other type of suitable communicable connection or combination of connections as would be known in the art. The replicated information residing on database 31 may be revised at database 31 and the revised replicated information communicated to memory devices 2B, 3B, and/or 2B' over communicable connection 32.

In certain embodiments of the invention in system 30, communicable connection 32 need not comprise a permanent communicable connection, as in the case where the information residing on memory devices 2B, 3B, and/or 2B' may be overwritten with portable memory reading device 5 and/or 5'. In those embodiments, revised replicated information may be transferred from database 31 to portable memory reading device 5 and/or 5' over a suitable connection and subsequently read to memory devices 2B, 3B, and/or 2B' when memory reading device 5 and/or 5' is placed in close proximity to memory devices 2B, 3B, and/or 2B'.

In still further embodiments of system 30, users of the system may utilize the identifying codes that are uniquely associated with memory devices 2B, 3B, and/or 3B' to access the replicated information residing on database 31 either with or without the use of memory reading device 5 and/or 5', depending on the type of devices employed as memory reading device 5 and/or 5'. A user of the system accesses database 31 through an internet with a browser or some other suitable form of software, a telephone connection, including wireless telephone connections, or any other type of suitable communications medium or combination of mediums as would be known in the art, provides the identifying code for the remote location 2, 3, and/or 21 he or she is interested in receiving information about, and database 31 provides the replicated information corresponding to remote location 2, 3, and/or 21 to the user over the communication medium employed upon receipt of the identifying code.

Figure 4:
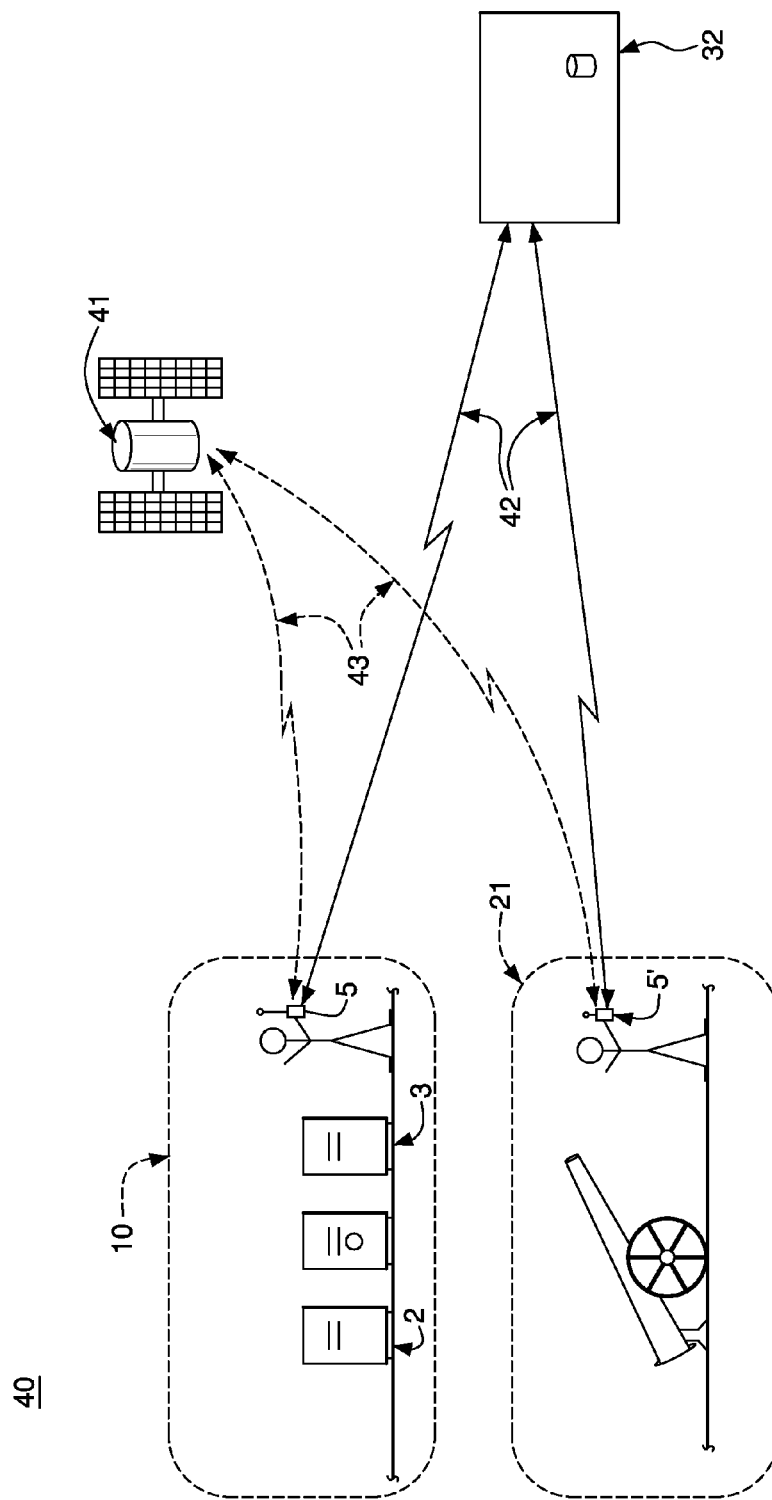
FIG. 4 is a block diagram of a system for providing information related to a remote location in accordance with a fourth embodiment of the invention.

Referring now to FIG. 4, there is shown a block diagram of a system 40 for providing information relate to remote locations in accordance with a fourth embodiment of the invention. System 40 comprises locations 2 and 3 within cemetery 10, historically notable location 21, memory reading devices 5 and 5', database 32, communication links 42 between memory reading devices 5 and 5' and database 32, the Global Positioning System (GPS) infrastructure 41, and GPS signals 43. Locations 2 and 3, cemetery 10, historically notable location 21, memory reading devices 5 and 5', and database 32 comprise the same elements as in systems 1, 20, and/or 30 described above. In system 40 though, memory reading devices 5 and 5' also comprise GPS receivers, and preferably wireless communications devices or smart wireless communications devices with GPS receivers integrated therein. Communication links 42 comprise the same types of connections a user would employ to access database 32 in system 30. When memory reading device 5 or 5' is positioned near cemetery location 2 or 3 or historically notable location 21, memory reading device 5 or 5' determines its position on the surface of the earth through the use of GPS signals 43 transmitted by GPS system infrastructure 41, accesses database 32 via communication links 42, and communicates its GPS position to database 32. Database 32 determines the remote location associated with the GPS position received from memory reading device 5 or 5' via communication links 42, in this case cemetery location 2 or 3 or historical location 21, and communicates the information related to remote locations 2, 3, and/or 21 to memory reading device 5 or 5' over communication links 42. The information may then be displayed or communicated to a user of system 40 located at or near remote location 2, 3, and/or 21. In some embodiments of the invention, a user of system 40 may be required to initiate access to database 32 over communication links 42, and/or may be required to provide an identification number, code or password before the information related to remote location 2, 3, and/or 21 can be accessed by and/or communicated to memory device 5 or 5'.

In any embodiment of the invention, including the embodiments shown and described above, the information related to a remote location may also comprise, in addition to information specifically related to the remote location, data, symbols, codes, and/or other information not specifically related to the remote location that may be used to access the information specifically related to the remote location, whether resident on a memory device at a remote location or a database located somewhere other than the remote location. Moreover, the remote locations where the invention may be employed are not limited to cemetery and historically notable locations, but may comprise any location that a person may find notable that is physically removed from easily accessible sources of power and communication, regardless of whether the climatic conditions likely encountered would be considered extreme. Thus, systems and methods for providing information related to a remote location have been shown and described. Users of the systems and methods have the ability among other things to store, receive, and/or revise the information related to the remote location in a number of ways. The foregoing descriptions of the preferred embodiments is provided to enable any person skilled in the art to make or use the present invention. Various modifications to the embodiments described above however will be readily apparent to those skilled in the art, and the generic principles defined herein may be applied to other embodiments without the use of inventive faculty. Thus, the present invention is not intended to be limited to the specific systems and methods shown herein but is to be accorded the widest scope consistent with the claims set forth below.

The invention claimed is:

1. A system for providing memorial information about a deceased party interred at a cemetery location, said system comprising:
    (A) a memory device affixed to a physical object positioned at the cemetery location, the memory device being accessible to any public user, the memory device including a programmable random access memory suitable for storing the memorial information on the memory device;
    (B) a portable device holdable by one of the public users, separate from the memory device, that retrieves the memorial information directly from the memory device via a non-permanent proximity link when positioned at the cemetery location, and that communicates the memorial information to at least one of the public users located at the cemetery location;
    wherein the portable device is capable of loading data corresponding to the memorial information, and wherein the data corresponding to the memorial information is stored internally within the programmable random access memory of the memory device, and wherein the memory device is free from physical connection to a source of the data at least while the memory device is positioned at the cemetery location, and wherein the memory device is powered via a data line at least while the memory device is positioned at the cemetery location and actively connected to the portable device via the non-permanent proximity link; and
    wherein said communication of the memorial information to at least one of the public users located at the cemetery location sequentially follows and is substantially temporally commensurate with said retrieval of the memorial information directly from the memory device.

2. The system of claim 1, wherein the memory device is permanently affixed to the physical object.

3. The system of claim 1, wherein the physical object comprises a stationary object.

4. The system of claim 1, wherein the memory device comprises a weather resistant memory device.

5. The system of claim 1, wherein the information resides on the memory device in extensible markup language format.

6. The system of claim 1, wherein said information resides on the memory device in hypertext markup language format.

7. A system for providing historical information about a historically notable location, said system comprising:
   (A) a memory device affixed to a physical object positioned at the historically notable location, in a publicly accessible area, the memory device including a programmable random access memory suitable for storing the historical information on the memory device;
   (B) a portable device, separate from the memory device, held by a user, that retrieves the historical information directly from the memory device via a non-permanent proximity link when positioned at the historically notable location and communicates the historical information to a user located at the historically notable location;
   wherein the portable device is capable of loading data corresponding to the historical information, and wherein the data corresponding to the historical information is stored internally within the programmable random access memory of the memory device, and wherein the memory device is free from physical connection to a source of the data at least while the memory device is positioned at the historically notable location, and wherein the memory device is powered via a data line at least while the memory device is positioned at the historically notable location and actively connected to the portable device via the non-permanent proximity link; and
   wherein said communication of the historical information to the user located at the historically notable location sequentially follows and is substantially temporally commensurate with said retrieval of the historical information directly from the memory device.

8. The system of claim 7, wherein the memory device is permanently affixed to the physical object.

9. The system of claim 7, wherein the physical object comprises a stationary physical object.

10. The system of claim 7, wherein the memory device comprises a weather resistant memory device.

11. The system of claim 7, wherein the historical information resides on the memory device in extensible markup language format.

12. The system of claim 7, wherein the historical information resides on the memory device in hypertext markup language format.

13. A method for providing information related to a remote location, the information comprising memorial information about a deceased party where the remote location comprises a cemetery location, said method comprising:
   (A) storing the information on a memory device having programmable random access memory, the information being stored in a format for direct retrieval from the memory device and display to a user with a portable device, wherein the portable device is separate from the memory device, when the portable device reads directly form the memory device via a non-permanent proximity link; and
   (B) affixing the memory device to a physical object positioned at the remote location;
   wherein the portable device is capable of loading data corresponding to the information, and wherein the data corresponding to the information is stored internally within the programmable random access memory of the memory device, and wherein the memory device is free from physical connection to a source of the data at least while the memory device is positioned at the remote location, and wherein the memory device is powered via a data line at least while the memory device is positioned at the remote location and actively connected to the portable device via the non-permanent proximity link; and
   wherein said communication of the information to the user located at the remote location sequentially follows and is substantially temporally commensurate with said retrieval of the information directly from the memory device.

14. A system for providing information related to a geographically remote and publicly accessible location, said system comprising:
   (A) a memory device affixed to a physical object at the geographically remote and publicly accessible location, the memory device including a programmable random access memory suitable for storing the information on the memory device;
   (B) a portable device, separate from the memory device, held by a user, that directly retrieves the information from the memory device via a non-permanent proximity link when positioned at the geographically remote and publicly accessible location and communicates the information to a user located at the geographically remote and publicly accessible location;
   wherein the portable device is capable of loading data corresponding to the information, and wherein the data corresponding to the information is stored internally within the programmable random access memory of the memory device, and wherein the memory device is free from physical connection to a source of the data at least while the memory device is positioned at the geographically remote and publicly accessible location, and wherein the memory device is powered via a data line at least while the memory device is positioned at the geographically remote and publicly accessible location and actively connected to the portable device via the non-permanent proximity link; and
   wherein said communication of the information to the user located at the geographically remote and publicly accessible location sequentially follows and is substantially temporally commensurate with said retrieval of the information directly from the memory device.

15. The system of claim 14, wherein the memory device comprises a weather resistant memory device.

16. The system of claim 14, wherein the information resides on the memory device in extensible markup language format.

17. The system of claim 14, wherein the information resides on the memory device in hypertext markup language format.

18. A system for providing information related to a geographically remote and publicly accessible location, said system comprising:

a memory device affixed at the geographically remote and publicly accessible location, the memory device including a programmable random access memory suitable for storing the information on the memory device;

a portable device, separate from said memory device;

a data connector, wherein said data connector, upon wired connection to said portable device and upon contact with said memory device, passed the information directly from said memory device positioned at the geographically remote and publicly accessible location to said portable device located at the geographically remote and publicly accessible location via a non-permanent proximity link;

wherein the portable device is capable of loading data corresponding to the information, and wherein the data corresponding to the information is stored internally within the programmable random access memory of the memory device, and wherein the memory device is free from physical connection to a source of the data at least while the memory device is positioned at the geographically remote and publicly accessible location, and wherein the memory device is powered via a data line at least while the memory device is positioned at the geographically remote and publicly accessible location and actively connected to the portable device via the non-permanent proximity link; and wherein communication of the information to a user of the portable reader located at the geographically remote and publicly accessible location sequentially follows and is substantially temporally commensurate with said passing of the information directly from the memory device.

19. A data retrieval system for retrieving information relating to an object positioned in a remote and infrequently visited location, comprising:

a memory device affixed to an object positioned in a remote and infrequently visited location, wherein said memory device is powered via a data line and includes a random access memory for storing information relating to said object;

a portable device, wherein said portable device is capable of directly loading said information relating to said object onto said memory device via said data line; and wherein said portable device is further capable of retrieving said information directly from said memory device via said data line;

wherein said portable device communicates said retrieved information relating to said object to said user.

20. A data retrieval system for retrieving information relating to an object positioned in a remote and infrequently visited location, comprising:

a memory device affixed to a first object, wherein said memory device is powered via a data line and includes a random access memory for storing information relating to a second object, wherein said first object and said second object are positioned in a remote and infrequently visited location, but within proximity of each other;

a portable device, wherein said portable device is capable of directly loading said information relating to said second object onto said memory device affixed to said first object via a said data line; and wherein said portable device retrieves said information directly from said memory device affixed to said first object via said data line;

wherein said portable device communicates said retrieved information relating to said second object to said user.

* * * * *